L. P. JUDSON,
Assignor to J. BRINKERHOFF.
Fence.
No. 8,096. Reissued Feb. 19, 1878.
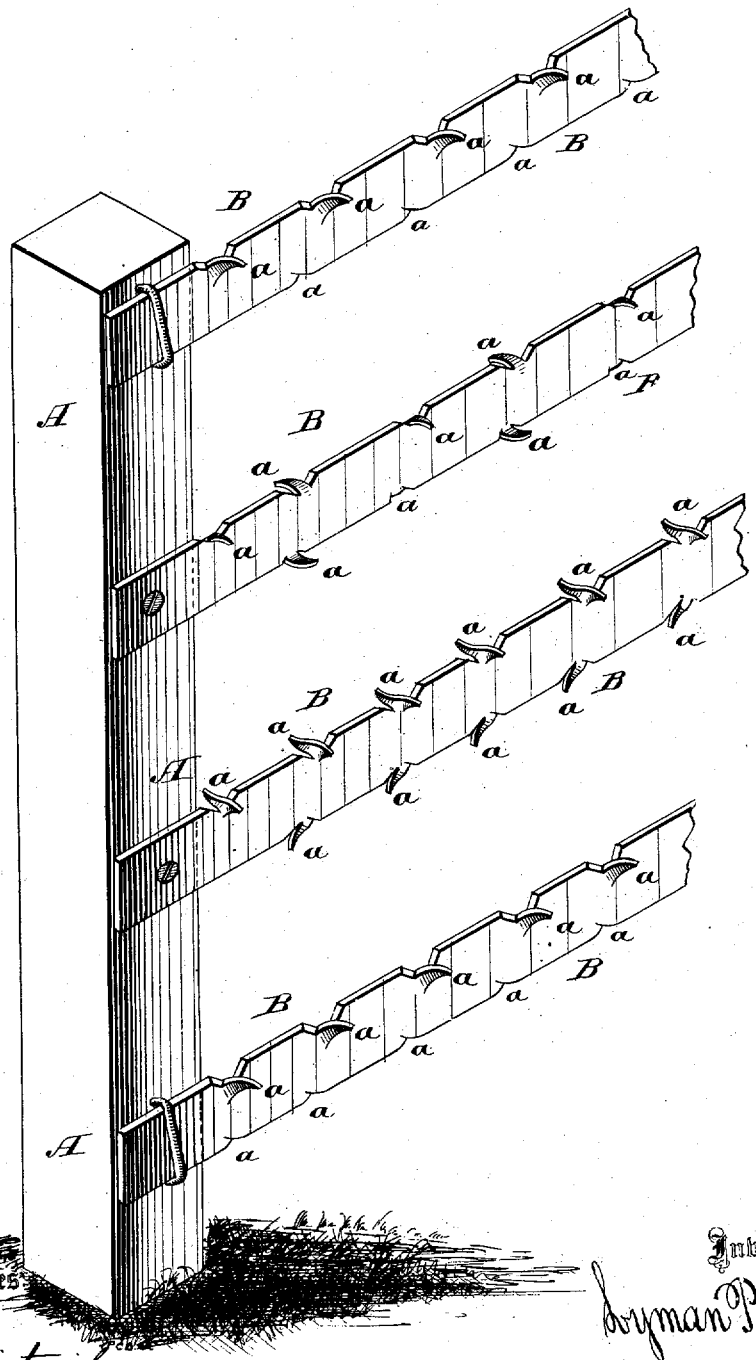
Witnesses:
P. C. Dieterich
C. H. Watson
Inventor:
Lyman P. Judson.
Per C. H. Watson & Co. Attorneys.
THE NORRIS PETERS CO., PHOTO-LITHO., WASHINGTON, D. C.

UNITED STATES PATENT OFFICE.

LYMAN P. JUDSON, OF ROSE, N. Y., ASSIGNOR TO JACOB BRINKERHOFF.

IMPROVEMENT IN FENCES.

Specification forming part of Letters Patent No. 118,135, dated August 15, 1871; Reissue No. 8,096, dated February 19, 1878; application filed January 26, 1878.

*To all whom it may concern:*

Be it known that I, LYMAN P. JUDSON, of Rose, in the county of Wayne and State of New York, have invented certain new and useful Improvements in Fences; and I do hereby declare that the following is a full, clear, and exact description thereof, that will enable others skilled in the art to which it appertains to make and use the same, reference being had to the accompanying drawing, and to the letters of reference marked thereon, which form a part of this specification.

This invention relates to fences which are provided with spurs or barbs, and used to deter animals from breaking or pushing down the fence; and instead of the ordinary wood rail or board, I use metallic strips or bars, and provide them with spurs or barbs, the invention consisting in having the spurs or barbs integral with the strips or bars. If desired, enlarged wire may be used in a similar way, having the points cut from its surface, and projecting outward.

Referring to the annexed drawing, the figure represents a perspective view of a part of a fence.

A represents a fence-post; B B B B, the several metallic strips or bars embodying my invention, which are wrought into form suitable for the lengths of a fence. These strips or bars may be of any desired width or thickness.

Several distinct forms of the spurs are shown and illustrated in the drawing. Others, of any desired form or shape, may be used.

In the second length from the top regular saw-teeth are formed; but I do not confine myself to any particular shape or form of spurs or barbs.

In all cases heretofore, as far as known, where fencing material has been provided with spurs or barbs, the spurs or barbs have been formed separate from the fencing material and attached to it, and are liable to become loose and get displaced, and frequently entirely detached from the fencing material; and where spurs or barbs have heretofore been combined with metallic fencing material, the joint between the two metallic bodies produced by attaching the barbs collect and retain moisture, thereby inducing rust, which soon destroys the barbs, and also the fencing material itself, wherever these joints are formed; but by having the spurs or barbs integral with the fencing material, as in my invention, all of these difficulties are entirely obviated.

I do not claim, broadly, the use of metallic strips or bars for fencing material; neither do I claim, broadly, the use of spurs or barbs; but,

Having thus fully described my invention, I claim as new and desire to secure by Letters Patent—

1. A fence made with metallic strips or bars, in which the edges of the lengths are cut and formed into projecting spurs or barbs.

2. As a new article of manufacture for the lengths of a fence, metallic material provided with projecting spurs or barbs integral therewith, for the purpose set forth.

3. An improved fencing material, consisting of a metallic strip or bar, wrought into form suitable for fencing, and having spurs or barbs formed on the edge thereof and integral therewith.

In testimony that I claim the foregoing I have hereunto set my hand this 26th day of January, 1878.

LYMAN P. JUDSON.

Witnesses:

C. H. WATSON,
FRANK GALT.